United States Patent [19]

Chemla

[11] Patent Number: 4,626,075
[45] Date of Patent: Dec. 2, 1986

[54] LIGHT BEAM APPLIED TO A LAYERED SEMICONDUCTOR STRUCTURE IS CONTROLLED BY ANOTHER LIGHT BEAM

[75] Inventor: Daniel S. Chemla, Rumson, N.J.

[73] Assignee: AT&T Bell Laboratories, Murray Hill, N.J.

[21] Appl. No.: 737,571

[22] Filed: May 23, 1985

Related U.S. Application Data

[63] Continuation of Ser. No. 455,462, Jan. 3, 1983, abandoned.

[51] Int. Cl.$^4$ .................. G02F 1/015; G02F 1/19; G02F 1/35
[52] U.S. Cl. .................. 350/354; 350/96.14; 350/386; 350/393
[58] Field of Search .................. 350/96.14, 353–354, 350/356, 363, 381, 386, 393; 358/213, 241; 307/430; 357/45 L

[56] References Cited

U.S. PATENT DOCUMENTS

| | | | |
|---|---|---|---|
| 3,295,911 | 1/1967 | Ashkin et al. | 350/386 |
| 4,190,811 | 2/1980 | Alcock et al. | 350/354 |
| 4,515,429 | 5/1985 | Smith et al. | 350/354 |

OTHER PUBLICATIONS

Miller et al, "Large Room-Temperature Optical Nonlinearity in GaAs/Ga$_{1-x}$Al$_x$As Multiple Quantum Well Structures", App. Phys. Lett., 10-1982, pp. 679–681.
McFee et al, "Beam Deflection & Amplitude Modulation of 10.6-um Guided Waves by Free Carrier Injection in GaAs-AlGaAs Heterostructures", App. Phys. Lett., 11-1977, pp. 571–573.
Gibbs et al, "Room-Temperature Excitonic Optical Bistability in a GaAs-GaAlAs Superlattice Etalon", App. Phys. Lett., 8-1982, pp. 221–222.
Gibbs et al, "Optical Modulation by Optical Tuning of a Cavity", App. Phys. Lett., 4-1979, pp. 511–514.
Smith et al, "Optical Bistability at a Non-Linear Interface", App. Phys. Letts., 12-1979, pp. 846–848.
Gibbs et al, "Optical Bistability in Semiconductors", App. Phys. Letts., 9-1979, pp. 451–453.
Tsu et al, "Nonlinear Optical Response of Conduction Electrons in a Superlattice", App. Phys. Letts., 10-1971, pp. 246–248.
Jha et al, "Nonlinear Optical Susceptibilities in Group-IV & III-V Semiconductors", Physical Review, 7-1968, pp. 891–898.
Van der Ziel et al, "Laser Oscillation from Quantum States in Very Thin GaAs-Al$_{0.2}$Ga$_{0.8}$As Multilayer Structures", App. Phys. Lett., 4-1975, pp. 463–465.
Reinhart et al, "Efficient GaAs-Al$_x$Ga$_{1-x}$As Double-Heterostructure Light Modulators", Appl. Phys. Lett., 1-1972, pp. 36–38.
Smith et al, "Bistable Optical Devices Promise Subpicosecond Switching", IEEE Spectrum, 6-1981, pp. 26–33.
Tarng et al, "External Off & On Switching of a Bistable Optical Device", Appl. Phys. Lett., 2-1982, pp. 205–207.

Primary Examiner—William H. Punter
Attorney, Agent, or Firm—Richard B. Havill; Daniel D. Dubosky

[57] ABSTRACT

A nonlinear optical device includes a layered semiconductor structure having layers of different energy band gap materials. Alternate layers of the structure are arranged for containing trapped charge. An input light beam is applied to the layers. A control light beam varies the trapped charge for controlling propagation of the input light beam through the structure.

9 Claims, 15 Drawing Figures

LIGHT BEAM APPLIED TO A LAYERED SEMICONDUCTOR STRUCTURE IS CONTROLLED BY ANOTHER LIGHT BEAM

This application is a continuation of application Ser. No. 455,462, filed Jan. 3, 1983, now abandoned.

BACKGROUND OF THE INVENTION

The invention relates to nonlinear optical devices which may be described more particularly as nonlinear optical devices using a layered semiconductor structure for controlling one light beam by another light beam.

In the prior art, the deflection of a light beam is achieved by changing the refractive index of an interaction medium through which a controlled light beam and a controlling light beam pass at an angle to each other. The interaction medium consists of an optically saturable dye which may be either in a liquid solution or in a solid solution. Optical pumping by the controlling light beam causes changes in the refractive index of the interaction medium.

It is desirable to develop solid state devices for controlling a light beam in integrated optical devices. A problem exists in that the prior art devices either are not solid state devices or are solid state devices which are not compatible with semiconductor materials used for making integrated circuits.

SUMMARY OF THE INVENTION

The problem is solved by a nonlinear optical device including a layered semiconductor structure having layers of different energy band gap materials. Alternate layers are arranged for containing trapped charge. A constant intensity input light beam is applied to the layers. A control light beam varies the trapped charge in the layered semiconductor structure for controlling propagation of the input light beam through the structure.

BRIEF DESCRIPTION OF THE DRAWINGS

A better understanding of the invention may be derived from the detailed description following if that description is read with reference to the attached drawings wherein.

DETAILED DESCRIPTION

Figure 1:
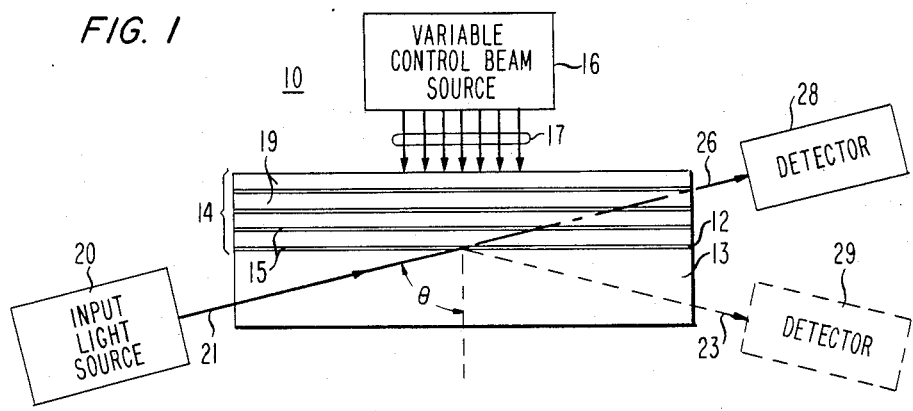
FIG. 1 is a schematic diagram of an optical device embodying the invention.

Referring now to FIG. 1, an optical device 10 is a nonlinear switching arrangement including an optical interface 12 between a linear optical material 13 and a nonlinear optical material 14. The linear optical material 13 is a solid substrate material, such as a semiconductor material. $Ga_{1-x}Al_xAs$ is an alloy system from which a linear optical material can be selected. The linear optical material 13 has an index of refraction $n_o$. The nonlinear optical material 14 is a layered semiconductor structure containing alternate layers of a small energy band gap material 15 and a large energy band gap material 19. The layers of materials are lattice matched with the substrate and with each other. One type of layered semiconductor material is a multiple quantum well structure that includes multilayer films of single crystal GaAs and $Ga_{1-x}Al_xAs$. The nonlinear optical material has an intensity dependent refractive index $n = n_1 + n_2 I$ that produces an optical Kerr effect. In this expression, I is the intensity of light applied to the medium, $n_1$ is the zero-intensity refractive index, and $n_2$ is the optical Kerr coefficient. With this system of materials, the device 10 operates effectively in a wavelength larger than 0.85 micrometers. The refractive index $n_o$ of the linear optical material is slightly smaller than the zero-intensity refractive index $n_1$ of the nonlinear optical material. The optical Kerr coefficient $n_2$ has a negative sign.

The structure is designed for trapping a predetermined quantity of charge in the material of layers 15. The layers 15 are intrinsic semiconductor layers, such as GaAs, having a small energy band gap. A control beam source 16 applies to the device 10 a control light beam 17 having a variable intensity I. A diode laser driven by a variable current source or a laser with a variable neutral filter will provide a suitable control beam source. The control light beam has a wavelength within the absorption range of the nonlinear optical material. Absorbed light photoexcites carriers within the layers 15 and thereby releases charge from valence bands in the small energy band gap material of those layers. A predetermined quantity of charge is released and trapped in the layers 15 while the device is energized by the control light beam 17. A wave function of the trapped charge in the layers 15 is an oscillating sine waveform. An intrinsic semiconductor, such as $Ga_{1-x}Al_xAs$, is formed into the large energy band gap material layers 19 which are thick enough so that the trapped charge in any layer 15 is isolated from the charge in every other layer 15. Any trapped charge which spreads into the layers 19, decreases exponentially therein. The trapped charge penetrates into the layers 19 on the order of ten to twenty angstroms. With the layers 19 five to ten times thicker than the penetration of the trapped charge, each layer 15 operates as an independent square well.

In FIG. 1 an input light source 20 of monochromatic light produces a light beam 21 that is applied to the layers of the optical device 10. The wavelength of the input light beam is in the transparency range of the nonlinear optical material. This input light beam is directed through the linear optical material 13 to the optical interface 12 between the linear optical material 13 and the nonlinear optical material 14. The input light beam 21 is directed along an axis which is positioned at an angle of incidence $\theta$ that is greater than the critical angle of incidence for high intensity values of the control light beam. The source 20 produces the input light beam 21 with a constant intensity $I_f$. The control beam source 16 produces the control light beam 17 which is directed into the layered structure where it is absorbed for creating charge in the layers 15. As long as the beam 17 is applied, the charge is trapped in the layers 15.

Figure 2:
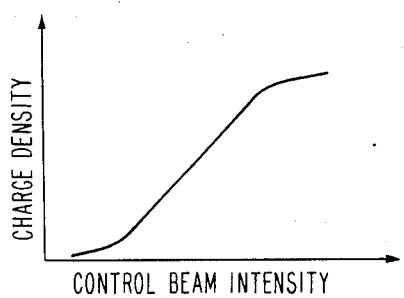
FIGS. 2, 3 and 4 are a group of operating characteristic curves for the device of FIG. 1.

FIG. 2 shows a plot of the charge density in the layers 15 in response to the intensity of the control light beam 17 of FIG. 1. Intensity of the control light, or charge energizing, beam 17 is selected so that the refractive index $n_o$ of the linear optical material 13 is slightly less than the refractive index $n = n_1 + n_2I$ of the nonlinear layered material for low intensities of the control light beam and slightly more than the refractive index n for high intensities of the control light beam.

Figure 3:
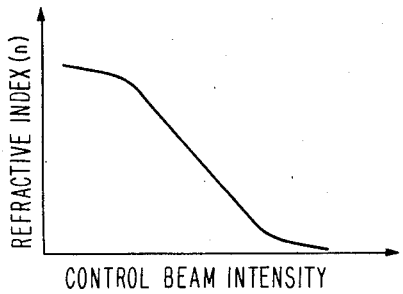

As shown in FIGS. 2 and 3, charge density increases and the nonlinear refractive index $n = n_1 + n_2I$ of the layered material decreases in dependence upon the intensity of the control light beam.

The reflectivity of the interface 12 is dependent upon the intensity I of the control light beam 17. For intensities below a critical intensity $I_C$ of the control light beam 17, the input light beam 21 is transmitted through the interface 12 and the layered nonlinear optical material 14 to an optical detector 28 as an output beam 26.

As the intensity of the control light beam 17 is increased, the refractive index n of the multiple quantum well structure decreases. This causes a positive feedback effect in which an increase of the control beam intensity reduces the effective critical angle. At the critical control beam intensity $I_C$, the refractive index n of the nonlinear optical material 14 equals the refractive index $n_o$ of the linear optical material 13. The nearly total transmission of the input beam through the interface 12 and the nonlinear optical material 14 switches to nearly total internal reflection. For control beam intensities greater than the critical intensity $I_C$, the input beam 21 is totally internally reflected at the optical interface 12. The reflected output beam 23 is transmitted through the linear optical material 13 away from the detector 28.

Figure 4:
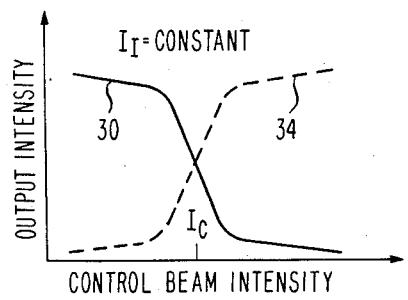

Referring now to FIG. 4, there is shown an operating characteristic for the device 10 in accordance with the foregoing description wherein the intensity $I_I$ of the input light beam is constant. The detector 28 of FIG. 1 determines whether the intensity of the control light beam is above or below the critical intensity $I_C$. As shown by the solid curve 30 in FIG. 4, control beam intensities below the critical intensity $I_C$ cause the detector 28 to receive a high intensity of light in the output beam 26 of FIG. 1. When the control beam intensity is approximately equal to the critical intensity $I_C$, the output beam applied to the detector has a rapidly falling intensity in FIG. 4. For control beam intensities above the critical intensity $I_C$, the output beam 26 applied to the detector 28 of FIG. 1 has a low intensity in FIG. 4.

The dotted curve 34 in FIG. 4 represents the operating characteristic of the arrangement of FIG. 1 when the detector is positioned in an alternate position shown by a dotted detector 29.

As a result of the change of the refractive index n with the intensity of the control light beam, the optical device 10 of FIG. 1 either transmits the input beam through the layered nonlinear material to the detector 28 or else nearly totally reflects the input beam away from detector 28. Thus control of the input light beam at the interface 12 between the linear optical material and the layered nonlinear optical material is dependent upon the intensity of the control light beam.

Because the operative phenomenon is a dynamic movement of the trapped charge in response to changes of intensity of the control light beam, the rate of turn-on response of the device 10 is as rapid as the changes of intensity of the light beam 17. The rate of the turn-off response of the device 10 is related to the recombination time of the charge. Thus the speed of operation potentially is high.

Figure 5:
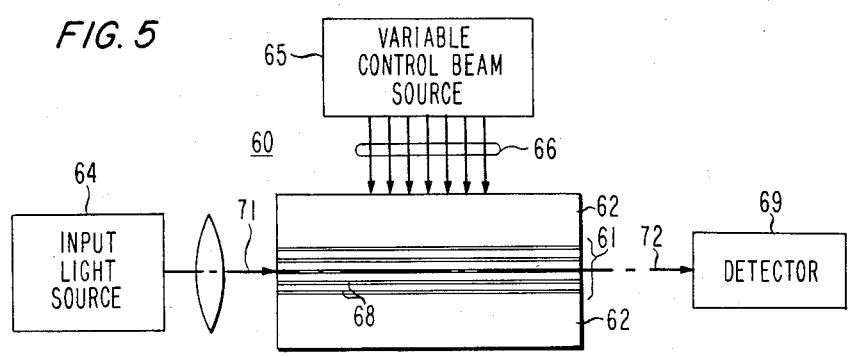
FIG. 5 is a schematic diagram of another optical device embodying the invention.

Referring now to FIG. 5, there is shown another optical device 60 embodying the invention. A layered nonlinear optical material 61, such as a multiple quantum well structure, forms an optical waveguide arrangement with a linear optical material 62. No charge is doped into the low energy band gap material of the layers 68 of the nonlinear optical material 61. A control beam source 65 produces a control light beam 66 which is directed into the layered structure where it is absorbed for releasing charge in the layers 68. As long as the control light beam 66 is applied, some of the released charge is trapped in the layers 68. The charge density in the layers 68 is varied in response to the intensity of the control light beam 66. For a low intensity of the control light beam 66, the refractive index $n_o$ of the linear material 62 is slightly less than the refractive index $n = n_1 + n_2I$ of the nonlinear layered material 61. As the intensity of the control light beam is increased, the charge density increases and the nonlinear refractive index $n = n_1 + n_2I$ of the layered material decreases in dependence upon the intensity of the control light beam.

An input light source 64 produces a constant intensity monochromatic input light beam 71 which is applied to the layered nonlinear optical material along an axis which is parallel to the layers of the nonlinear material. The wavelength of the input light beam is in the transparency range of the nonlinear optical material. For low intensities of the control light beam 66, the input beam 71 is guided through the layered nonlinear optical material 61 to a detector 69. As the intensity of the control light beam 66 is varied from the low value to a high value, the refractive index n of the layered material changes as a result of the optical Kerr effect. At a critical intensity $I_C$ of the control light beam, the refractive index $n_o$ of the linear material 62 equals the refractive index n of the nonlinear material 61. For high intensities of the control light beam, above the critical intensity, the input beam 71 is not guided. Thus the input beam 71 spreads into the linear optical material reducing the intensity of light incident upon the detector 69.

The operating characteristic curve 30 of FIG. 4 also represents operation of the device of FIG. 5. The input light beam is either guided through the nonlinear optical material 61 to the detector 69 or spread through the linear optical material 62. Guiding the input light beam 71 to the detector in response to a low intensity control beam 66 causes a high intensity output beam 72 to be applied to the detector 69. Spreading the input light beam 71 through the linear optical material in response to a high intensity control beam 66 causes the output beam 72 to be a low intensity.

Figure 6:
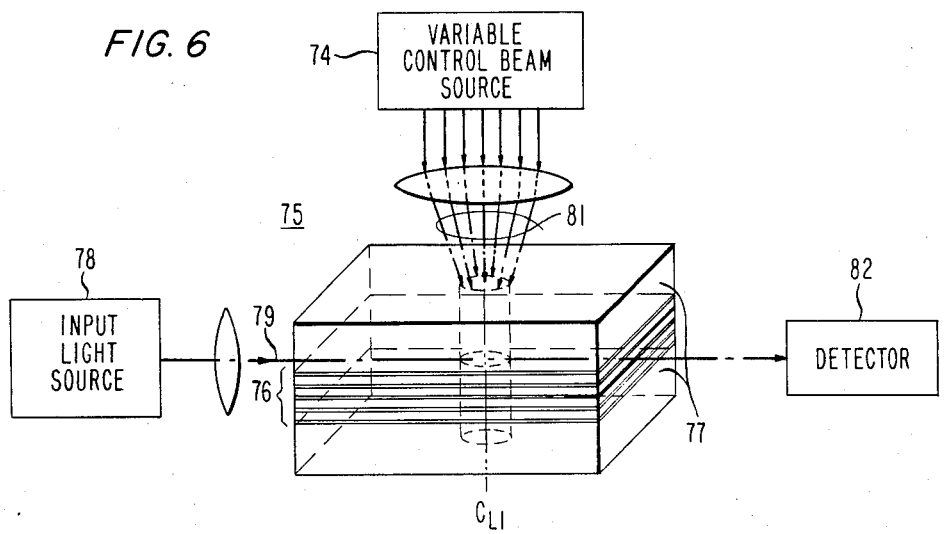
FIG. 6 is a perspective schematic diagram of still another optical device embodying the invention.

Referring now to FIG. 6, there is shown an optical device 75 which includes a layered nonlinear optical material 76 sandwiched between layers of linear optical material 77. The nonlinear optical material may be a multiple quantum well structure, as previously described.

A light source 78 applies an input light beam 79 of monochromatic light to an edge of the layered nonlinear optical material 76 along an axis substantially parallel to the layers. The wavelength of the input light beam is in the transparency range of the nonlinear optical material 76. The input light beam is transmitted through the nonlinear optical material to a detector 82.

By way of a lens 73, a control beam source 74 applies a variable intensity control light beam 81 along an axis that is substantially perpendicular to the layers of the nonlinear optical material 76. The control light beam 81 traverses the layers of the sandwich. The wavelength of the control light beam is within the absorption range of the nonlinear optical material. Absorbed light releases charge in the small energy band gap material. The charge is trapped therein.

Figure 7:
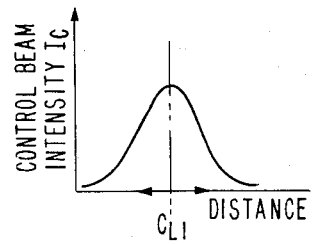
FIG. 7 is an intensity distribution curve for a control light beam used in the arrangement of FIG. 6.

As shown in FIG. 7, a spatial intensity distribution, taken across any diameter of the control light beam as it traverses the layered structure, is a function of distance from the center axis of the beam. Illustratively in FIG. 7, a Gaussian distribution, with its peak value positioned at center line $C_{L1}$ of the control light beam 81 in FIG. 1, is used for simplicity. Other distributions may also be used.

Figure 8:
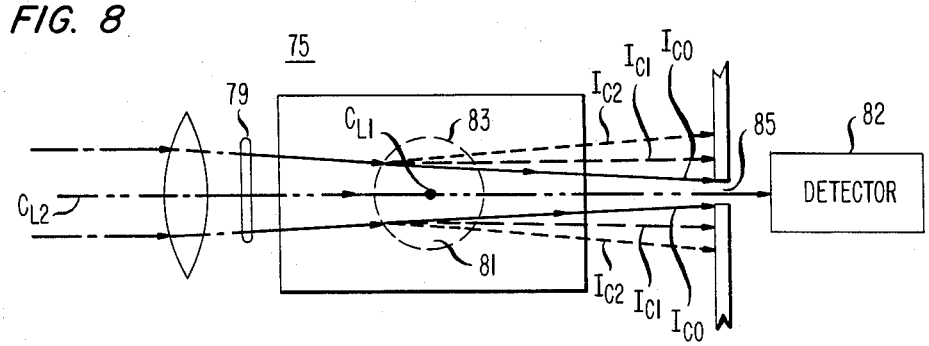
FIG. 8 is a top view of a device similar to the arrangement of FIG. 6.

Referring now to FIGS. 8, 9, 10 and 11, operation of one specie of the device 75 of FIG. 6 will be described. In the arrangement of FIG. 8 shown as a top view, the control light beam intersects the top surface of the device 75 in a circular cross section 83. The input light beam 79 is directed into the layered nonlinear optical material along an axis, or center line, $C_{L2}$ which intersects the center line $C_{L1}$ of the control light beam. Thus the input light beam cuts symmetrically through the zone of influence of the control light beam.

Any variation of the intensity of the control light beam 81 of FIG. 6 changes the optical response of the device 75. Changes of intensity of the control light beam cause variations of the quantity of charge trapped in the thin layers of the multiple quantum well structure. As the quantity of charge changes, it causes the dielectric constant, the absorption coefficient, and the refractive index to change. For instance increasing the intensity of the control light beam increases the charge and reduces the index of refraction of the multiple quantum well structure.

Figure 9:
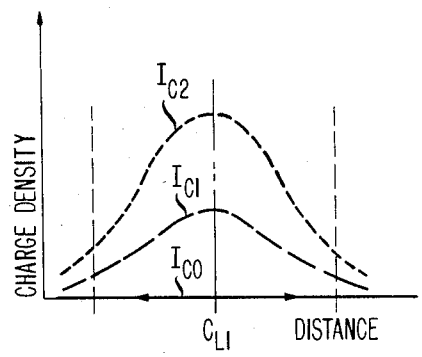
FIGS. 9, 10 and 11 are a group of operating characteristic curves for the device of FIG. 8.

In FIG. 9, there are three different charge distribution functions which show variation of the quantity and the distribution of charge in the nonlinear material with the distance from the center line $C_{L1}$ of the control light beam. The charge distribution functions of FIG. 9, represent charge distribution across the diameter of the control light beam 81 of FIG. 8. For a control light beam of zero-intensity $I_{C0}$, there is no trapped charge. For an intermediate intensity $I_{C1}$ of the control light beam, the charge is distributed in a Gaussian shape with its peak centered at the center line $C_{L1}$ of the control light beam. For a high intensity $I_{C2}$ of the control light beam, the Gaussian shaped charge distribution has a higher peak value.

Figure 10:
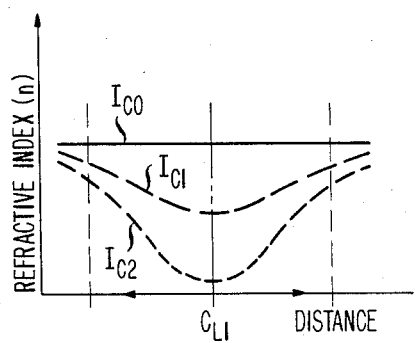

In FIG. 10, there are shown three different refractive index profiles labelled $I_{C0}$, $I_{C1}$, and $I_{C2}$ which correlate, respectively, with the similarly designated charge distribution functions of FIG. 9. It should be noted that as intensity and charge increases, the associated refractive index decreases.

Figure 11:
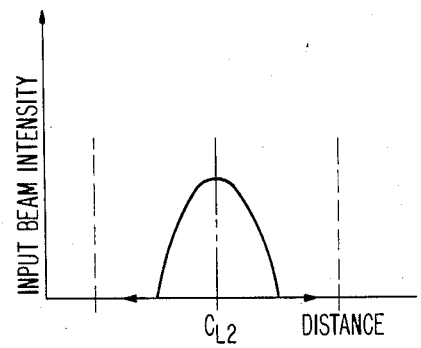

As shown in FIG. 11, the intensity of the input light beam 79 of FIG. 8 also has a nonuniform distribution. The distribution function is plotted with respect to distance from the center line $C_{L2}$ of the control light beam. As the input light beam with the intensity distribution of FIG. 11 traverses the zone of influence of the control light beam in FIG. 8, the input light beam 79 is influenced by any of the refractive index functions, such as those shown in FIG. 10 depending upon the intensity of the control light beam.

For zero-intensity $I_{C0}$ of the control beam 81, all portions of the input light beam are influenced by a uniform refractive index within the zone of influence of the control light beam. For the zero-intensity control beam condition, focusing of the input light beam 79 is unaffected by the control light beam, as shown by the exit beam path which is bounded by solid lines labelled $I_{C0}$ in FIG. 8.

For intermediate level intensity $I_{C1}$ of the control light beam 81, the input light beam 79 is influenced by the dashed refractive index function labelled $I_{C1}$ in FIG. 10. The input light beam is affected by the refractive index function. As a result, the exiting beam is defocused somewhat, as shown by the exit beam path which is bounded by the dashed lines labelled $I_{C1}$ in FIG. 8.

For high level intensity $I_{C2}$ of the control light beam 81, the input light beam 79 is influenced by a greater variation of the refractive index, as shown by a dotted line $I_{C2}$ in FIG. 10. The result is greater defocusing of the exiting beam, as shown by the exit beam path which is bounded by the dotted lines labelled $I_{C2}$ in FIG. 8.

Thus the detector 82 of FIG. 8 receives through an aperture 85 a relatively high intensity level of light when the control light beam has zero-intensity. As the control light beam intensity increases, the exiting beam spreads out more and more. The detector therefore receives light of less and less intensity as the control light beam increases in intensity. The operating characteristic curve 30 of FIG. 4 additionally represents the intensity of light received by the detector 82 in FIG. 8.

Figure 12:
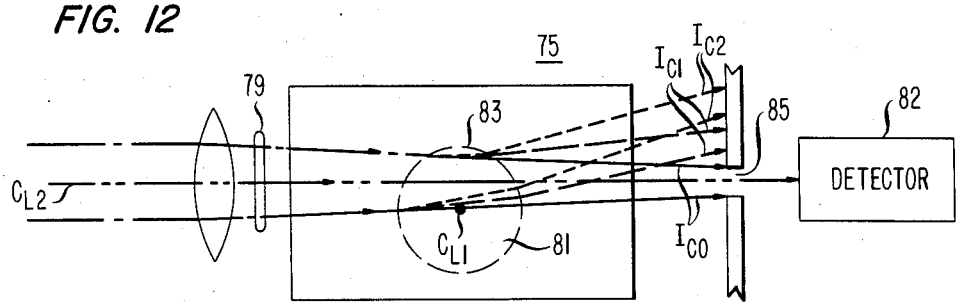
FIG. 12 is a top view of another device similar to the arrangement of FIG. 6.

Referring now to FIGS. 12, 13, 14 and 15, operation of another specie of the device 75 of FIG. 6 can be described. In the arrangement of FIG. 12 shown as a top view, the control light beam 81 intersects the top surface of the device 75 in a circular cross section similar to the arrangement of FIG. 8. In the arrangement of FIG. 12, however, the input light beam 79 is applied to the layered nonlinear optical material along an axis which intersects the control light beam off center. In fact all of or almost all of the input light beam 79 is on one side of the center line $C_{L1}$ of the control light beam, as shown by the input light beam intensity distribution curve of FIG. 15.

Figure 13:
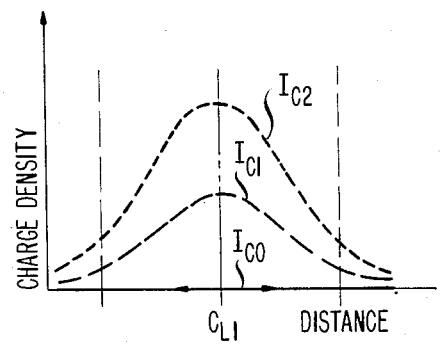
FIGS. 13, 14 and 15 are a group of operating characteristic curves for the device of FIG. 12.
Figure 14:
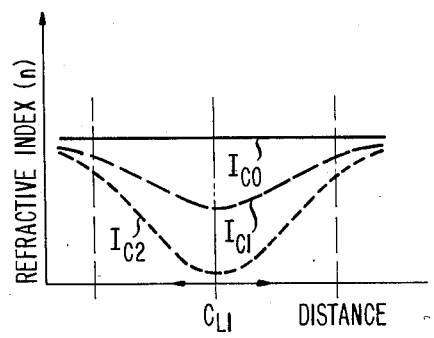
Figure 15:
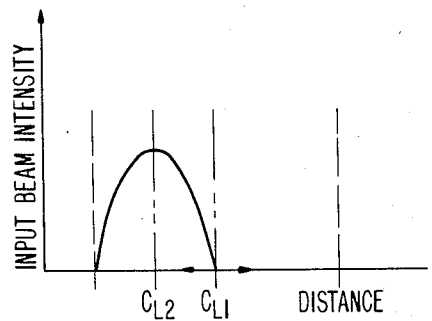

The intensity of the control light beam 81 changes the trapped charge in the nonlinear optical material similarly to the arrangement of FIG. 8. As a result there are variations in the dielectric constant, the absorption coefficient and the refractive index. In FIGS. 13 and 14, the charges of the quantity of charge and the refractive index are shown as functions of the distance from the center line $C_{L1}$ of the control light beam 81.

Because the center line $C_{L2}$ of the input light beam is offset from the center line $C_{L1}$ of the control light beam 81, the input light beam may be subject to nonsymmetrically different refractive indices at it traverses the zone of influence of the control light beam. For zero-intensity of the control light beam, the focus of the input beam is not influenced by the control ligh beam. Instead, as shown in FIG. 12, the input light beam is transmitted through the device 75 and the aperture 85 to the detector 82. Outlines of the output beam are shown by solid lines labelled $I_{C0}$. As the intensity of the control light beam is increased, the corresponding dashed and dotted charge density and refractive index functions, labelled $I_{C1}$ and $I_{C2}$ in FIGS. 13 and 14, cause the output light beam to bend successively greater amounts, as shown in FIG. 12 by similarly dashed and dotted outline paths, labelled $I_{C1}$ and $I_{C2}$, respectively.

Detector 82 receives a relatively high intensity of light when the control light beam is at zero-intensity or a low intensity. As the control light beam intensity increases, the intensity of light received by the detector decreases. The output intensity characteristic curve 30 of FIG. 4 is representative of the output light received by the detector 82 in the arrangement of FIG. 12.

Devices operating in accordance with the prior discussion can perform in a wide range of wavelengths. As previously described, devices fabricated in the mentioned material system, operate at wavelengths in a range of 0.7-0.9 micrometers for the control beam and at wavelengths greater than 0.85 micrometers in the transparency range of the nonlinear material for the input beam. With other material systems, such as $In_{1-x-y}Ga_xAl_yAs$ and $In_{1-x}Ga_xAs_{1-y}P_y$, devices can be fabricated for wavelengths in a range of 1.3-1.5 micrometers for the control beam and at wavelengths greater than 1.3 micrometers for the input beam. For wavelengths in between those ranges, the materials may be selected from either of the material systems.

In the illustrative embodiments only negative charge has been shown. It is noted that trapped positive charge also will provide useful devices. This trapped positive charge may be provided by optically energizing the layered material to release and trap the charge.

The foregoing describes several illustrative embodiments of the invention. Other embodiments will be obvious to those skilled in the art. The described embodiments together with those additional embodiments are considered to be within the scope of the invention.

What is claimed is:

1. An optical device comprising
   a multiple quantum well structure having alternate layers of a large energy band gap semiconductor material and a small energy band gap semiconductor material, the small energy band gap material layers being arranged for containing trapped charge;
   means for directing a first light beam having a constant intensity into the layers of the structure along an axis parallel to the layers, said first light beam having a wavelength that is in the transparency range of said multiple quantum well structure; and
   means for variably photoexciting the small energy band gap material layers with a second light beam having a wavelength in an absorption band of the small energy band gap material layers for releasing in the small energy band gap material layers a variable quantity of charge from their valence band to control the first light beam.

2. An optical device in accordance with claim 1 wherein
   the means for variably photoexciting a quantity of the trapped charge determine a variable dielectric constant of the multiple quantum well structure.

3. An optical device in accordance with claim 2 wherein the means for variably photoexciting a quantity of trapped charge vary the density of the charge to change the dielectric constant of the multiple quantum well structure.

4. An optical device in accordance with claim 1 further comprising
   an optical detector for receiving light from the first light beam, the optical detector being arranged for indicating different values of received light in response to different quantities of the trapped charge.

5. An optical device comprising
   an optical interface between a linear optical material and a layered semiconductor multiple quantum well structure including different energy band gap materials, alternate layers of the structure being arranged for containing trapped charge;
   a control light beam having a variable intensity and being incident upon the interface and the layers for varying the trapped charge in the layered structure, said control light beam having a wavelength in the absorption band of said quantum well structure; and
   means for applying an input light beam having a constant intensity to the interface through a path at an angle to the interface that is greater than a critical angle of incidence to the interface for high intensity values of the control light beam, said input light beam having a wavelength that is in the transparency range of said quantum well structure, whereby the varying trapped charge controls a change in the input light beam at the optical interface.

6. An optical device in accordance with claim 5 wherein
   the control light beam incident upon the interface photoexcites a selectable quantity of trapped charge to vary a dielectric constant of the layered semiconductor structure.

7. An optical device comprising an optical interface between a linear optical material and a multiple quantum well structure having alternate layers of a large energy band gap semiconductor material and a small energy band gap semiconductor material, the small energy band gap material layers being arranged for containing trapped charge;
   means for directing a first light beam into the optical interface along a path having an angle of incidence near the critical angle of the interface, said first light beam having a wavelength that is in the transparency range of said multiple quantum well structure; and
   means for variably photoexciting the small energy band gap material layers with a second light beam having a wavelength in an absorption band of at least one of the small energy band gap material layers for releasing a variable quantity of charge from its valence band to control the first light beam at the interface.

8. An optical device comprising
   an optical interface between a linear optical material and a layered semiconductor multiple quantum well structure including different energy band gap materials, alternate layers of the structure being arranged for containing trapped charge,
   a control light beam incident upon the layers of the structure changes intensity for varying the quantity of trapped charge in and a dielectric constant of the layered semiconductor structure, said control light beam having a wavelength in an absorption band of said multiple quantum well structure,
   means for applying a constant intensity input light beam to the interface of the structure along an axis having an angle of incidence to the interface that is greater than a critical angle of incidence to the interface for high intensity values of the control light beam, said input light beam having a wavelength that is in the transparency range of said multiple quantum well structure, whereby the varying trapped charge and dielectric constant of the layers control the input light beam.

9. An optical device comprising
an optical interface between a linear optical material and a multiple quantum well structure, the multiple quantum well structure having alternate layers of a large energy band gap semiconductor material and a small energy band gap semiconductor material, the large and small energy band gap material layers being arranged for containing trapped charge in the small energy band gap material,
means for variably photoexciting the small energy band gap material layers with a control light beam having a wavelength in an absorption band of the small energy band gap material layers and releasing in the small energy band gap material layers a variable quantity of trapped charge from their valence band; and
means for directing a constant intensity input light beam into the interface and layers of the structure along an axis at an angle of incidence to the interface and layers that is greater than a critical angle of incidence to the interface for high intensity values of the control light beam, said input light beam having a wavelength that is in the transparency range of said multiple quantum well structure, whereby varying the quantity of trapped charge controls the input light beam at the interface.

* * * * *